United States Patent
Yi et al.

(10) Patent No.: US 8,427,579 B2
(45) Date of Patent: Apr. 23, 2013

(54) FRAME RATE CONVERSION APPARATUS AND METHOD FOR ULTRA DEFINITION IMAGE

(75) Inventors: Kwon Ju Yi, Yongin-si (KR); Jae Joon Lee, Seoul (KR); Du Sik Park, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 777 days.

(21) Appl. No.: 12/382,868

(22) Filed: Mar. 25, 2009

(65) Prior Publication Data

US 2010/0128169 A1 May 27, 2010

(30) Foreign Application Priority Data

Nov. 26, 2008 (KR) .................. 10-2008-0118108

(51) Int. Cl.
*H04N 7/01* (2006.01)
*H04N 11/20* (2006.01)
(52) U.S. Cl.
USPC .......................................... 348/459; 348/452

(58) Field of Classification Search ........... 348/441–459
See application file for complete search history.

(56) References Cited

U.S. PATENT DOCUMENTS

| 4,276,565 | A * | 6/1981 | Dalton et al. ................. 348/458 |
| 6,778,168 | B2 * | 8/2004 | Mamiya et al. ............... 345/204 |
| 2010/0118185 | A1 * | 5/2010 | Furukawa et al. ............ 348/452 |

FOREIGN PATENT DOCUMENTS

| JP | 2000-41224 | 2/2000 |
| KR | 1997-0066921 | 10/1997 |
| KR | 10-2008-0019432 | 3/2008 |

* cited by examiner

*Primary Examiner* — Michael Lee
(74) *Attorney, Agent, or Firm* — Staas & Halsey LLP (57) ABSTRACT

A frame rate conversion apparatus and method for an Ultra-High Definition (UD) image. The frame rate conversion apparatus may store a previous frame and a current frame of an edge of an input image, divided into N images, and insert an interpolation frame between the current frame and the previous frame. Also, the frame rate conversion apparatus may convert a frame rate of each of the N images.

15 Claims, 9 Drawing Sheets

FRAME RATE CONVERSION APPARATUS AND METHOD FOR ULTRA DEFINITION IMAGE

CROSS-REFERENCE TO RELATED APPLICATIONS

This application claims the benefit of Korean Patent Application No. 10-2008-0118108, filed on Nov. 26, 2008, in the Korean Intellectual Property Office, the disclosure of which is incorporated herein by reference.

BACKGROUND

1. Field

Example embodiments of the following description relate to a frame rate conversion technology which interpolates a frame using image data of a previous frame and a current frame of an edge and increases a frame refresh rate when dividing and processing an Ultra-High Definition (UD) image.

2. Description of the Related Art

Currently, processing methods for Ultra-High Definition (UD) video are required due to the advent of 1920×1080 full High Definition (HD) digital cinema. However, since a UD image includes a larger amount of data than a full HD video, a clock frequency must be increased or a video must be divided in order to be simultaneously processed.

In an existing Liquid Crystal Display (LCD) panel, shortcomings, due to a low frame refresh rate, such as motion blur or film judder may be aggravated when a screen size is increased.

For example, a pixel clock speed of a full HD video at 60 Frame Per Second (FPS) is approximately 150 MHz, although the pixel clock speed may insignificantly change according to a stream. Also, a pixel clock speed to replay a 4096×2160 4 k digital cinema and a 4× full HD video of 3840×2160 at 60 fps is approximately 150×4 (600) MHz.

However, shortcomings such as heat generation, limit of switching time in a circuit, and the like must be overcome to process a UD image using existing Application Specific Integrated Circuit (ASIC) technology.

SUMMARY

According to example embodiments, there may be provided a frame rate conversion apparatus, including N−1 memories to store a previous frame and a current frame of an edge of an input image, the input image being divided into N images, and N frame rate converters to convert a frame rate of each of the N images by referring to each of the N−1 memories.

According to example embodiments, there may be provided a frame rate conversion method, including: storing a previous frame and a current frame of an edge of an input image in each of N−1 memories, the input image being divided into N images, and converting a frame rate of each of the N images through N frame rate converters by referring to the stored previous frame and the stored current frame.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of example embodiments will become apparent and more readily appreciated from the following description, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
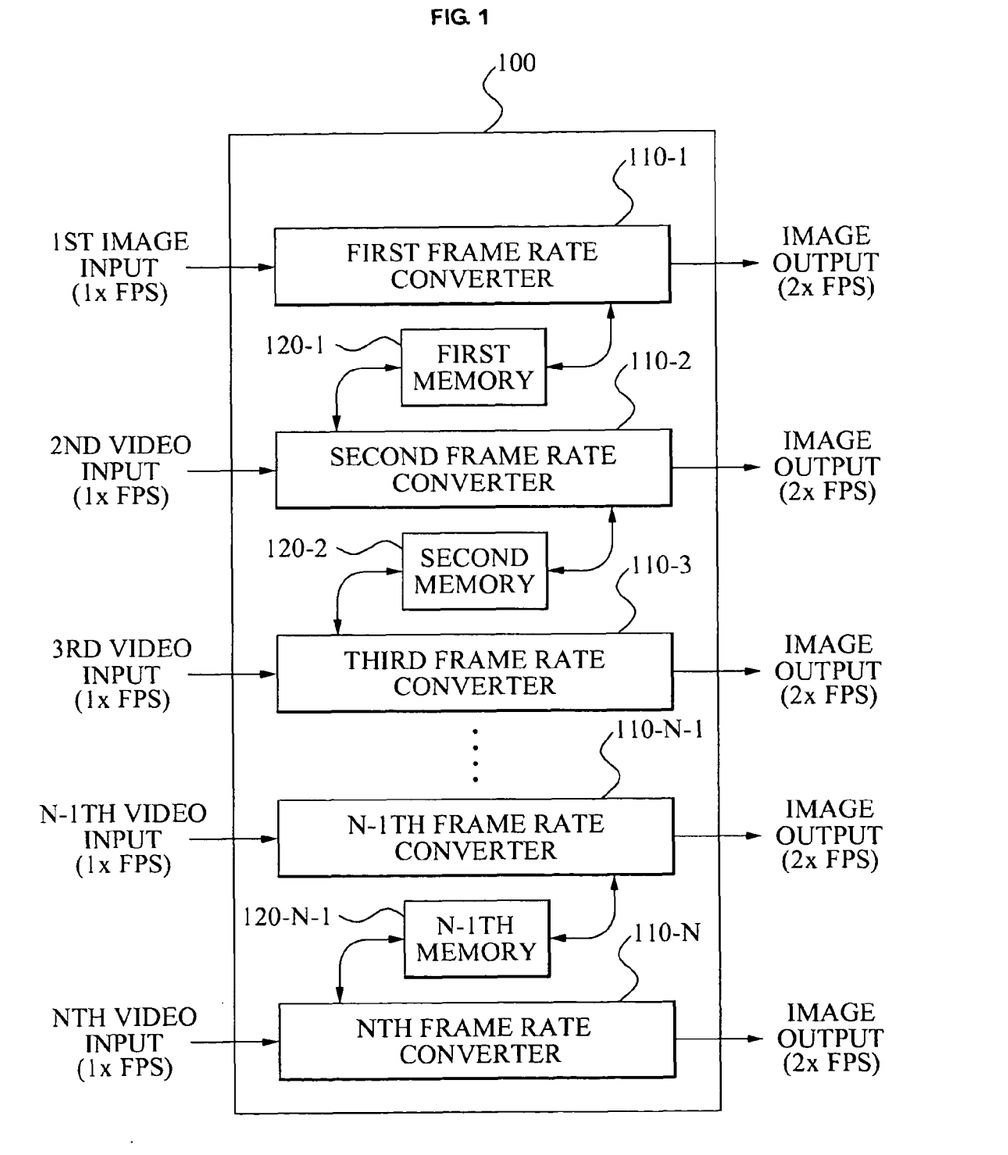
FIG. 1 is a diagram illustrating a configuration of a frame rate conversion apparatus for an Ultra-high Definition (UD) image according to example embodiments.

FIG. 1 is a diagram illustrating a configuration of a frame rate conversion apparatus 100 for an Ultra-high Definition (UD) image according to example embodiments.

Referring to FIG. 1, the frame rate conversion apparatus 100 for a UD image may include, for example, N frame rate converters 110-1, 110-2, 110-3, 110-N−1, and 110-N, and N−1 memories 120-1, 120-2, 120-3, and 120-N−1 in parallel.

The frame rate conversion apparatus 100 may divide an input image into N images, and input each of the N images in the N frame rate converters 110-1, 110-2, 110-3, 110-N−1, and 110-N. Also, the frame rate conversion apparatus 100 may store image data, included in a division edge region of the input image, in the N−1 memories 120-1, 120-2, 120-3, and 120-N−1.

N frame rate converters 110-1, 110-2, 110-3, 110-N−1 and 100-N may convert a frame rate of each of the N images by referring to each of the N−1 memories 120-1, 120-2, 120-3, and 120-N−1. The N frame rate converters 110-1, 110-2, 110-3, 110-N−1, and 110-N may perform block-matching with respect to a predetermined macroblock of a previous image frame and a current image frame from among the input N images for motion estimation, and perform scanning within a search range. Also, when calculating a motion vector of a corresponding block, the N frame rate converters 110-1, 110-2, 110-3, 110-N−1, and 110-N may read image data of an adjacent divided image from the N−1 memories 120-1, 120-2, and 120-N−1, and convert the frame rate. For example, the second frame rate converter 110-2 may receive a second image from among the N images, read image data of an adjacent edge region of the second image from the first memory 120-1 and the second memory 120-2, and thereby may convert a frame rate of the received second image.

The N−1 memories 120-1, 120-2, and 120-N−1 may store a previous frame and a current frame of an edge of each of the N images. For example, the first memory 120-1 may sequentially store a previous frame and a current frame of an edge of the second image from among the N images.

The first frame rate converter 110-1 and the $N^{th}$ frame rate converter 110-N may refer to a single memory of the N−1 memories 120-1, 120-2, and 120-N−1 with respect to image information of an edge of an adjacent divided image for motion estimation. The second frame rate converter 110-2, the third frame rate converter 110-3, and the N−$1^{th}$ frame rate converter 110-N−1 may refer to two memories of the N−1 memories 120-1, 120-2, and 120-N−1 with respect to image information of both edges for motion estimation.

For example, the first frame rate converter 110-1 may refer to only first memory 120-1 with respect to the image information of the edge of the adjacent divided image for motion estimation. The $N^{th}$ frame rate converter 110-N may refer to only N−$1^{th}$ memory 120-N−1 with respect to the image information of the edge of the adjacent divided image for motion estimation.

For example, the second frame rate converter 110-2 may refer to the first memory 120-1 and the second memory 120-2 with respect to the image information of both of the edges for motion estimation.

The N frame rate converters 110-1, 110-2, 110-3, 110-N−1, and 110-N may use different motion vector extraction, interpolation frame generation, and scanning methods for motion estimation.

As described above, the frame rate conversion apparatus 100 may input/output image data required for an adjacent module from/to each of the N frame rate converters 110-1, 110-2, 110-3, 110-N−1, and 110-N, respectively. Accordingly, the frame rate conversion apparatus 100 may completely prevent a memory access collision.

Also, according to example embodiments, the frame rate conversion apparatus 100 may divide a UD image into N images, and convert a frame rate of each of the N images through the N frame rate converters 110-1, 110-2, 110-3, 110-N−1, and 110-N by referring to image data of the previous frame and the current frame of the edge. In this instance, the image data may be stored in the N−1 memories 120-1, 120-2, and 120-N−1. Accordingly, a frame replay speed may be improved.

Figure 2:
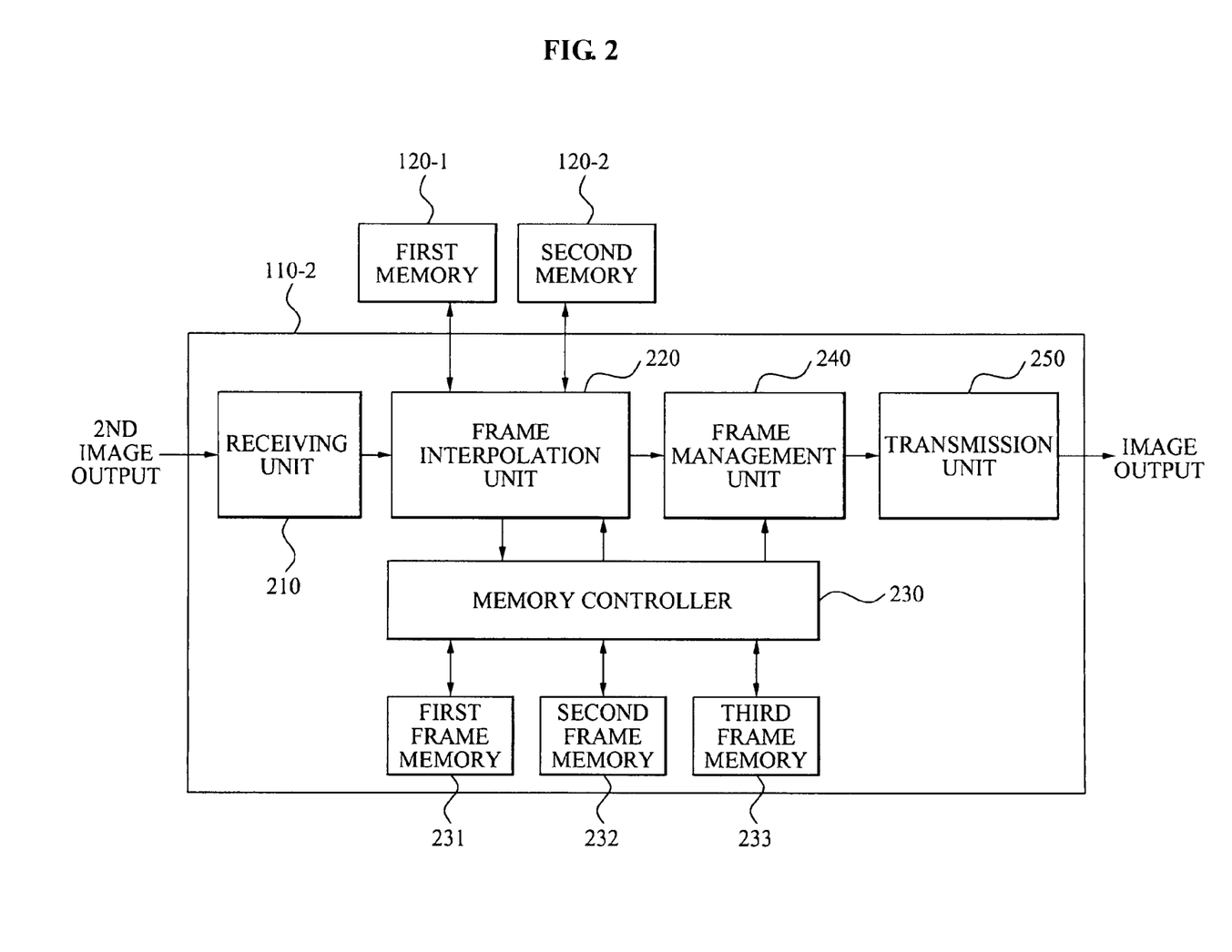
FIG. 2 is a diagram illustrating a configuration of a single frame rate converter according to example embodiments.

FIG. 2 is a diagram illustrating a configuration of a single frame rate converter according to example embodiments.

Referring to FIG. 2, a frame rate converter 110-2 may include, for example, a receiving unit 210, a frame interpolation unit 220, a memory controller 230, a first frame memory 231, a second frame memory 232, a third frame memory 233, a frame management unit 240, and a transmission unit 250.

The receiving unit 210 may receive any one of N images. In this instance, an input image may be divided into the N images. The receiving unit 210 may operate an input interface to receive any one of the N images. For example, the receiving unit 210 may receive an input division image of the N images.

The frame interpolation unit 220 may interpolate a frame of the input image. That is, the frame interpolation unit 220 may estimate motion in a previous division image frame and a current division image frame of the input image, and output an interpolated image frame. Here, the previous division image frame may indicate a previous frame of each of the N images, and the current division image frame may indicate a current frame of each of the N images.

The memory controller 230 may control the first frame memory 231, the second frame memory 232, and the third frame memory 233. Also, the memory controller 230 may interface the first frame memory 231, the second frame memory 232, and the third frame memory 233 with the frame interpolation unit 220 and the frame management unit 240.

The first frame memory 231 may buffer a previous frame of the input image. That is, the first frame memory 231 may buffer the previous frame of the input division image from among the N images.

The second frame memory 232 may buffer a current frame of the input image. That is, the second frame memory 232 may buffer the current frame of the input division image from among the N images.

The third frame memory 233 may buffer an interpolated frame of the input image. That is, the third frame memory 233 may buffer a frame where the previous frame and the current frame are interpolated from among the N images.

The frame management unit 240 may manage the previous frame, the current frame, and the interpolated frame. That is, the frame management unit 240 may insert the interpolated frame between the previous frame and the current frame. For example, the frame management unit 240 may use a delay circuit to insert the interpolated frame between the previous frame and the current frame.

The transmission unit 250 may transmit an output image including a frame managed by the frame management unit 240. That is, the transmission unit 250 may perform an output interface to transmit the output image. For example, a frame rate of the output image 2×FPS may be increased to be two times faster than a frame rate of the input image 1×FPS.

Figure 3:
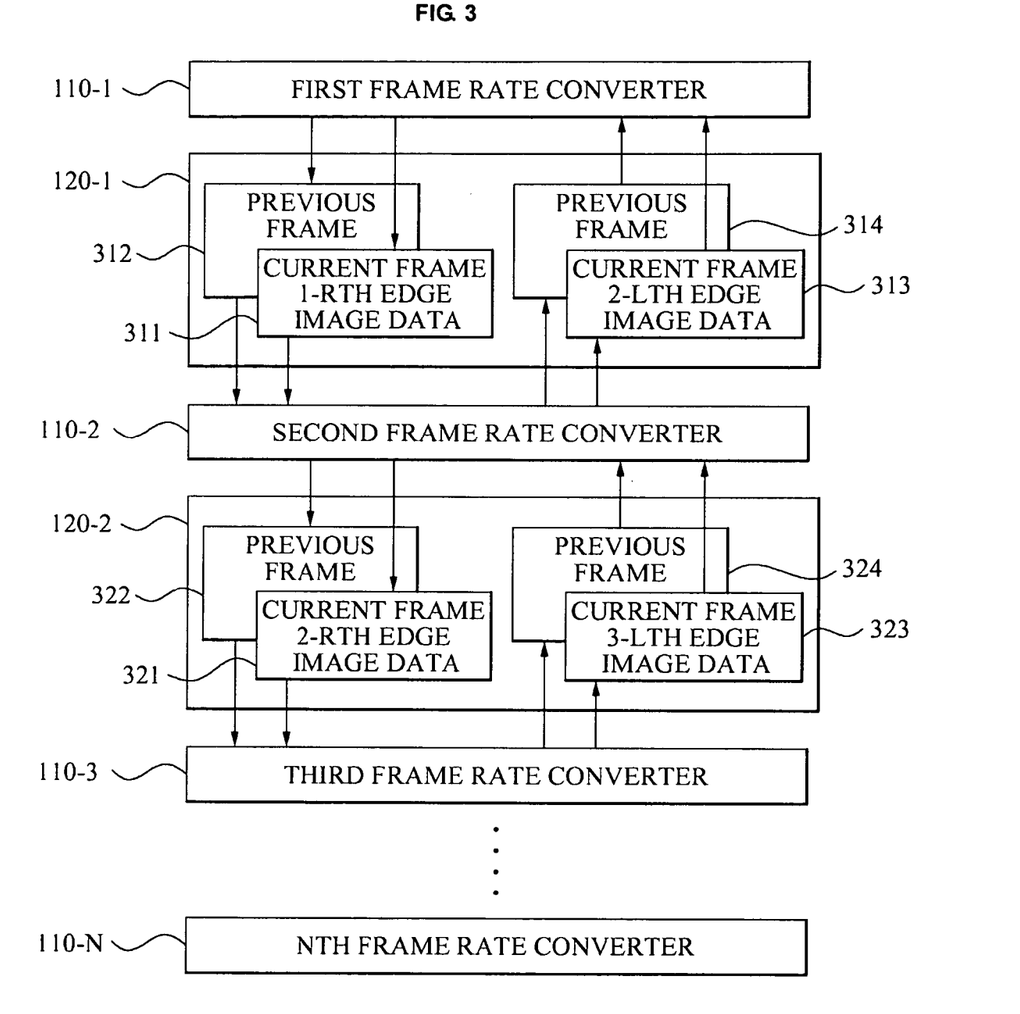
FIG. 3 is a diagram illustrating an example of an interface configuration of frame rate converters and memories of FIG. 1 to store image data of a division edge region.

FIG. 3 is a diagram illustrating an example of an interface configuration of the frame rate converters 110-1, 110-2, 110-3, and 110-N and the memories 120-1, 120-2, and 120-N−1 of FIG. 1 to store image data of a division edge region.

Referring to FIG. 3, a first memory 120-1 may store 1-$R^{th}$ edge image data 311 of a current frame and 1-$R^{th}$ edge image data 312 of a previous frame with respect to a first division image, and 2-$L^{th}$ edge image data 313 of the current frame and 2-$L^{th}$ edge image data 314 of the previous frame with respect to a second division image.

The first memory 120-1 may store the 1-$R^{th}$ edge image data 311 and the 1-$R^{th}$ edge image data 312 provided from the first frame rate converter 110-1. Also, the first memory 120-1 may provide the second frame rate converter 110-2 with the stored 1-$R^{th}$ edge image data 311 of the current frame and the stored 1-$R^{th}$ edge image data 312 of the previous frame.

The first memory 120-1 may store the 2-$L^{th}$ edge image data 313 and the 2-$L^{th}$ edge image data 314 of the previous frame provided from the second frame rate converter 110-2. Also, the first memory 120-1 may provide the first frame rate converter 110-1 with the stored 2-$L^{th}$ edge image data 313 of the current frame and the stored 2-$L^{th}$ edge image data 314 of the previous frame.

A second memory 120-2 may store 2-$R^{th}$ edge image data 321 of the current frame and 2-$R^{th}$ edge image data 322 of the previous frame with respect to the second division image, and 3-$L^{th}$ edge image data 323 of the current frame and 3-$L^{th}$ edge image data 324 of the previous frame with respect to a third division image.

The second memory 120-2 may store the 2-$R^{th}$ edge image data 321 and the 2-$R^{th}$ edge image data 322 provided from the second frame rate converter 110-2. Also, the second memory 120-2 may provide the stored 2-$R^{th}$ edge image data 321 of the current frame and the stored 2-$R^{th}$ edge image data 322 of the previous frame to a third frame rate converter 110-3.

The second memory 120-2 may store the 3-$L^{th}$ edge image data 323 and the 3-$L^{th}$ edge image data 324 provided from the third frame rate converter 110-3. Also, the second memory 120-2 may provide the stored 3-$L^{th}$ edge image data 323 of the current frame and the stored 3-$L^{th}$ edge image data 324 of the previous frame to the second frame rate converter 110-2.

According to example embodiments, a frame rate conversion apparatus 100 may block an access from another adjacent frame rate converter to its own frame memory, and may access its own frame memory and a separately added memory that may buffer image data to maintain a memory input/output speed of each of the frame rate converters 110-1, 110-2, 110-3, 110-N−1, and 110-N. Accordingly, the frame rate conversion apparatus 100 may remove a motion estimation error and improve a frame rate without an expensive high-speed memory.

Figure 4:
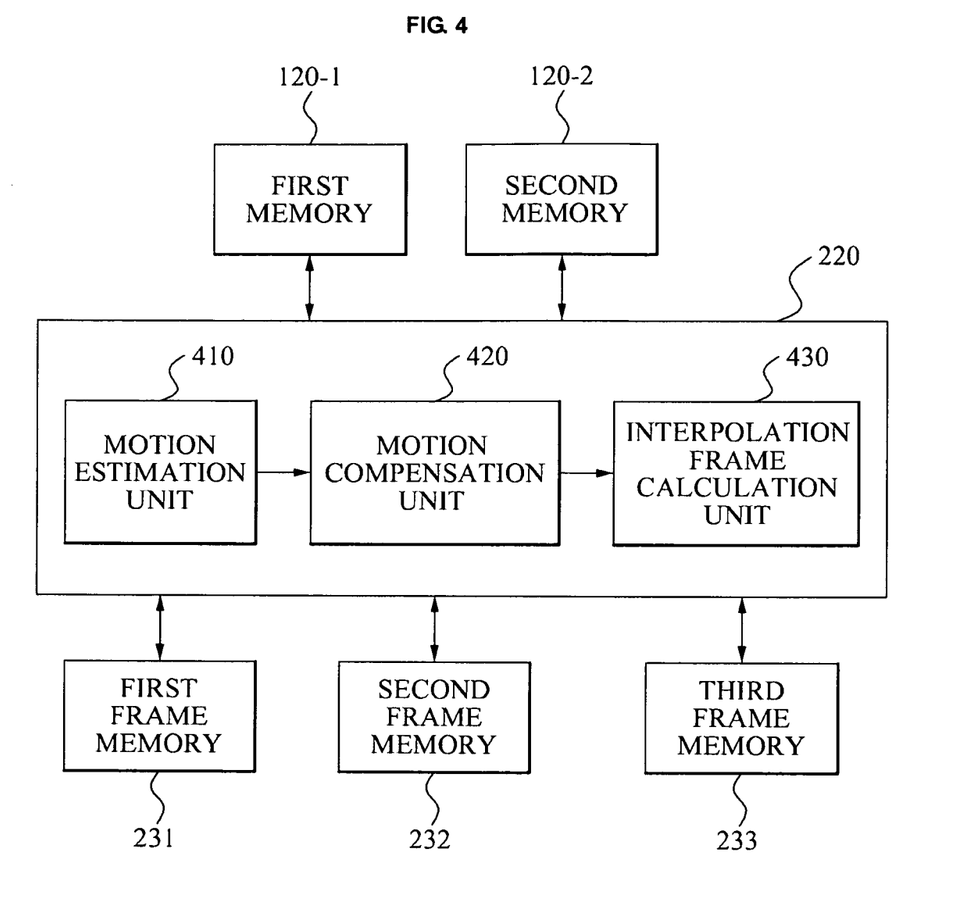
FIG. 4 is a diagram illustrating an example of a configuration of a frame interpolation unit of FIG. 2.

FIG. 4 is a diagram illustrating an example of a configuration of the frame interpolation unit 220 of FIG. 2.

Referring to FIG. 4, the frame interpolation unit 220 may include, for example, a motion estimation unit 410, a motion compensation unit 420, and an interpolation frame calculation unit 430.

The frame interpolation unit 220 may perform motion estimation using a block-matching algorithm for real-time image processing hardware in a frame rate up-conversion algorithm and perform compensation with respect to motion using a previous image frame, a subsequent image frame, and a motion vector generated due to the motion estimation. Accordingly, the frame interpolation unit 220 may perform movement-based image interpolation of an image where a new intermediate image frame is generated.

The motion estimation unit 410 may compare a macroblock of the previous division image frame and a macroblock of the current division image frame within a search range of a corresponding block, and thereby may calculate a motion vector map. Also, motion estimation unit 410 may calculate a motion vector around the edge. Specifically, the motion estimation unit 410 may calculate the motion vector map, read image data of the previous division image frame and image data of the current division image frame around the edge of the divided image frames from a first memory 120-1 and a second memory 120-2, and thereby may calculate the motion vector around the edge. For example, the motion estimation unit 410 may compare the macroblock of the previous division image frame and the macroblock of the current division image frame within the search range of a corresponding block using any of a Sum of Absolute Differences (SAD), a Mean of Absolute Differences (MAD), and a Mean Square Error (MSE). Also, the motion estimation unit 410 may determine a target block for calculating a smallest error to calculate the motion vector map, and read image data from the first memory 120-1 and the second memory 120-2 to calculate the motion vector.

The motion compensation unit 420 may compensate for motion around the edge using the calculated motion vector, the previous frame, and the current frame. That is, the motion compensation unit 420 may compensate for motion around the edge by referring to the motion vector calculated by the motion estimation unit 410, the image data of the previous division image frame, and the image data of the current division image frame from the first memory 120-1 and the second memory 120-2.

The interpolation frame calculation unit 430 may calculate a final interpolation frame based on the interpolated motion around the edge. That is, the interpolation frame calculation unit 430 may calculate an edge of the interpolated frame based on the interpolated motion by referring to the image data of the previous division image frame, and the image data of the current division image frame from the first memory 120-1 and the second memory 120-2.

As described above, the frame rate conversion apparatus 100 may reduce a number of accesses with respect to reading access of a first frame memory 231, a second frame memory 232, and a third frame memory 233 buffering division image frames, through the frame interpolation unit 220. Accordingly, the frame rate conversion apparatus 100 may increase a memory bandwidth.

Figure 5:
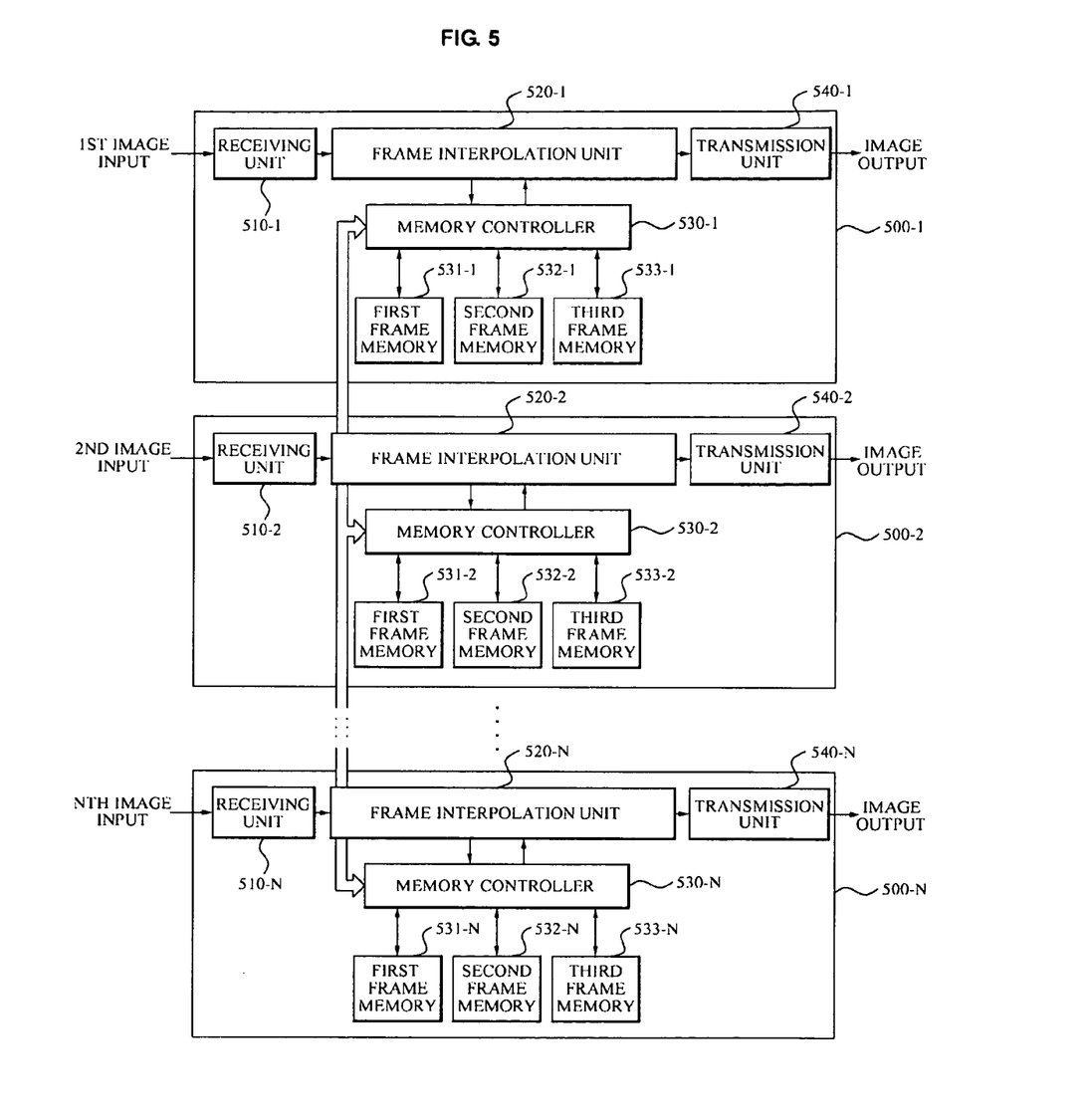
FIG. 5 is a diagram illustrating an example of a partition parallel configuration based on a direct access scheme of adjacent image data according to example embodiments.

FIG. 5 is a diagram illustrating an example of a partition parallel configuration based on a direct access scheme of adjacent image data according to example embodiments.

Referring to FIG. 5, N frame rate converters 500-1, 500-2, and 500-N may include frame interpolation units 520-1, 520-2, and 520-N, memory controllers 530-1, 530-2, and 530-N, first frame memories 531-1, 531-2, and 531-N, second frame memories 532-1, 532-2, and 532-N, third frame memories 533-1, 533-2, and 533-N, and transmission units 540-1, 540-2, and 540-N, respectively.

N memory controllers 530-1, 530-2, and 530-N of the N frame rate converters 500-1, 500-2, and 500-N may control the first frame memories 531-1, 531-2, and 531-N, the second frame memories 532-1, 532-2, and 532-N, and the third frame memories 533-1, 533-2, and 533-N. In this instance, the first frame memories 531-1, 531-2, and 531-N may buffer a previous frame. The second frame memories 532-1, 532-2, and 532-N may buffer a current frame. The third frame memories 533-1, 533-2, and 533-N may buffer a frame interpolated by the frame interpolation units 520-1, 520-2, and 520-N. Accordingly, a memory access collision among the N frame rate converters 500-1, 500-2, and 500-N may be completely prevented.

Figure 6:
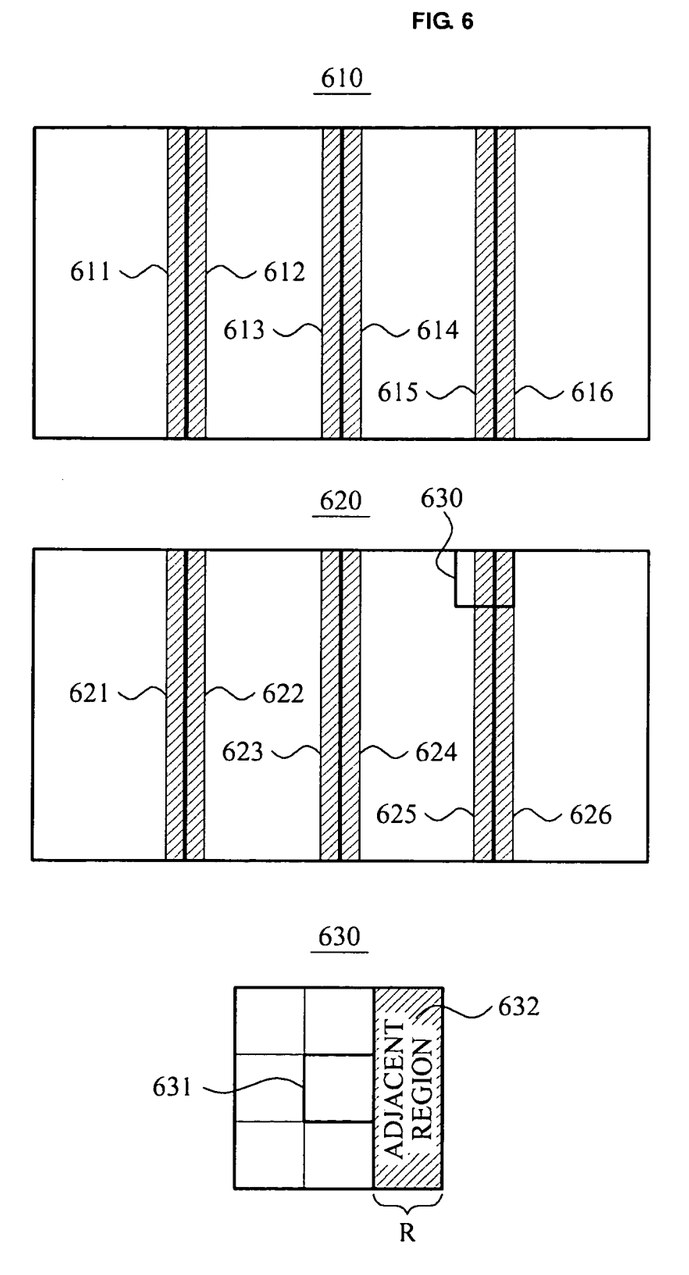
FIG. 6 is a diagram illustrating an example of a division edge region to be stored in a particular memory in an entire image according to example embodiments.

FIG. 6 is a diagram illustrating an example of a division edge region to be stored in a particular memory in an entire image according to example embodiments.

Referring to FIG. 6, image data 610 of a previous frame may include, for example, edge image data 611, 612, 613, 614, 615, and 616 of an edge of each of the divided images. The divided images may be obtained by dividing an entire image into four images, that is, a first image, a second image, a third image, and a fourth image.

The 1-$R_{th}$ edge image data 611 may be image data of an edge, located on a right side of the first image, from among edges of the first image and the second image in the image data 610.

The 2-$L_{th}$ edge image data 612 may be image data of an edge, located on a left side of the second image, from among edges of the first image and the second image in the image data 610.

The 2-$R_{th}$ edge image data 613 may be image data of an edge, located on a right side of the second image, from among edges of the second image and the third image in the image data 610.

The 3-$L_{th}$ edge image data 614 may be image data of an edge, located on a left side of the third image, from among edges of the second image and the third image in the image data 610.

The 3-$R_{th}$ edge image data 615 may be image data of an edge, located on a right side of the third image, from among edges of the third image and the fourth image in the image data 610.

The 4-$L_{th}$ edge image data 616 may be image data of an edge, located on a left side of the fourth image, from among edges of the third image and the fourth image in the image data 610.

Image data 620 of a current frame may include edge image data 621, 622, 623, 624, 625, and 626 of an edge of each of the divided images. The divided images may be obtained by dividing an entire image into four images, that is, a first image, a second image, a third image, and a fourth image.

The 1-$R_{th}$ edge image data 621 may be image data of an edge, located on a right side of the first image, from among edges of the first image and the second image in the image data 620.

The 2-$L_{th}$ edge image data 622 may be image data of an edge, located on a left side of the second image, from among edges of the first image and the second image in the image data 620.

The 2-$R_{th}$ edge image data 623 may be image data of an edge, located on a right side of the second image, from among edges of the second image and the third image in the image data 620.

The 3-$L_{th}$ edge image data 624 may be image data of an edge, located on a left side of the third image, from among edges of the second image and the third image in the image data 620.

The 3-$R_{th}$ edge image data 625 may be image data of an edge, located on a right side of the third image, from among edges of the third image and the fourth image in the image data 620.

The 4-$L_{th}$ edge image data 626 may be image data of an edge, located on a left side of the fourth image, from among edges of the third image and the fourth image in the image data 620.

For example, when dividing an entire image into four images as illustrated in FIG. 6, the N−1 memories 120-1, 120-2, and 120-N−1 of FIG. 1 may store the edge image data 611, 612, 613, 614, 615, and 616 with respect to the previous frame, and the edge image data 621, 622, 623, 624, 625, and 626 with respect to the current frame.

A search window 630 may be a search range for block-matching with respect to a macroblock 631 in the previous frame and the current frame using edge image data of an adjacent region R 632 for motion estimation.

According to example embodiments, a frame rate conversion apparatus 100 may locate each of the N−1 memories 120-1, 120-2, and 120-N−1 between two of the N frame rate converters 110-1, 110-2, 110-3, and 110-N to process image data of an R×length area of the entire image (adjacent search range), as well as locate image data of each of the divided images for more accurate motion estimation in the division edge region. Here, R may be a value of a top, bottom, left side, and right side of the macroblock 631. For example, in a UD screen of a macroblock=16×16, used in High Definition (HD) television (TV) and Moving Picture Experts Group (MPEG), the adjacent search range may be 16×2160. Accordingly, the frame rate conversion apparatus 100 may remove a motion estimation error in the division edge region. For example, the N−1 memories 120-1, 120-2, and 120-N−1 may store four times as much data as a 16×2160-sized block/frame as edge regions of a previous frame and a current frame of images are divided into halves.

Figure 7:
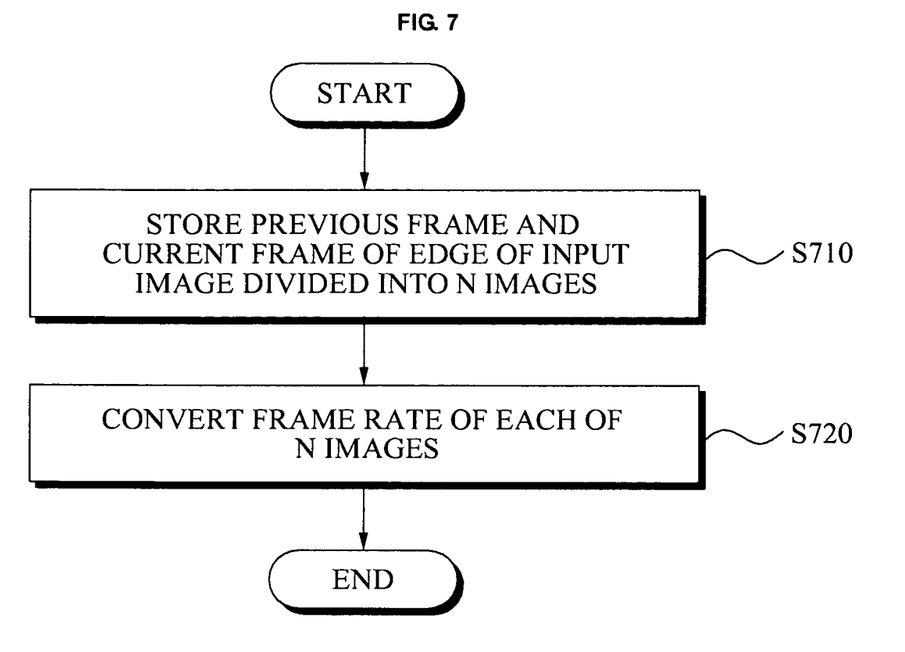
FIG. 7 is a flowchart illustrating a frame rate conversion method for an UD image according to example embodiments.

FIG. 7 is a flowchart illustrating a frame rate conversion method for a UD image according to example embodiments.

Referring to FIG. 7, in operation S710, a frame rate conversion apparatus may store a previous frame and a current frame of an edge of an input image in each of N−1 memories. In this instance, the input image may be divided into N images. For example, in operation S710, the frame rate conversion apparatus may store image data of the previous frame and image data of the current frame of the edge of each of the N images in each of the N−1 memories.

In operation S720, the frame rate conversion apparatus may convert a frame rate of each of the N images by referring to the stored previous frame and the stored current frame through N frame rate converters. Specifically, in operation S720, the frame rate conversion apparatus may perform block-matching with respect to a predetermined macroblock of a previous image frame and a current image frame from among the input N images for motion estimation, and perform scanning within a search range. Also, when calculating a motion vector of a corresponding block, the frame rate conversion apparatus may read image data of an adjacent divided image from the N−1 memories and convert the frame rate. For example, in operation S720, the frame rate conversion apparatus may receive a second image from among the N images, read image data of an adjacent edge region of the second image from the memories, and thereby may convert a frame rate of the second image.

Hereinafter, an operation of converting a frame rate is described in detail with reference to FIG. 8.

Figure 8:
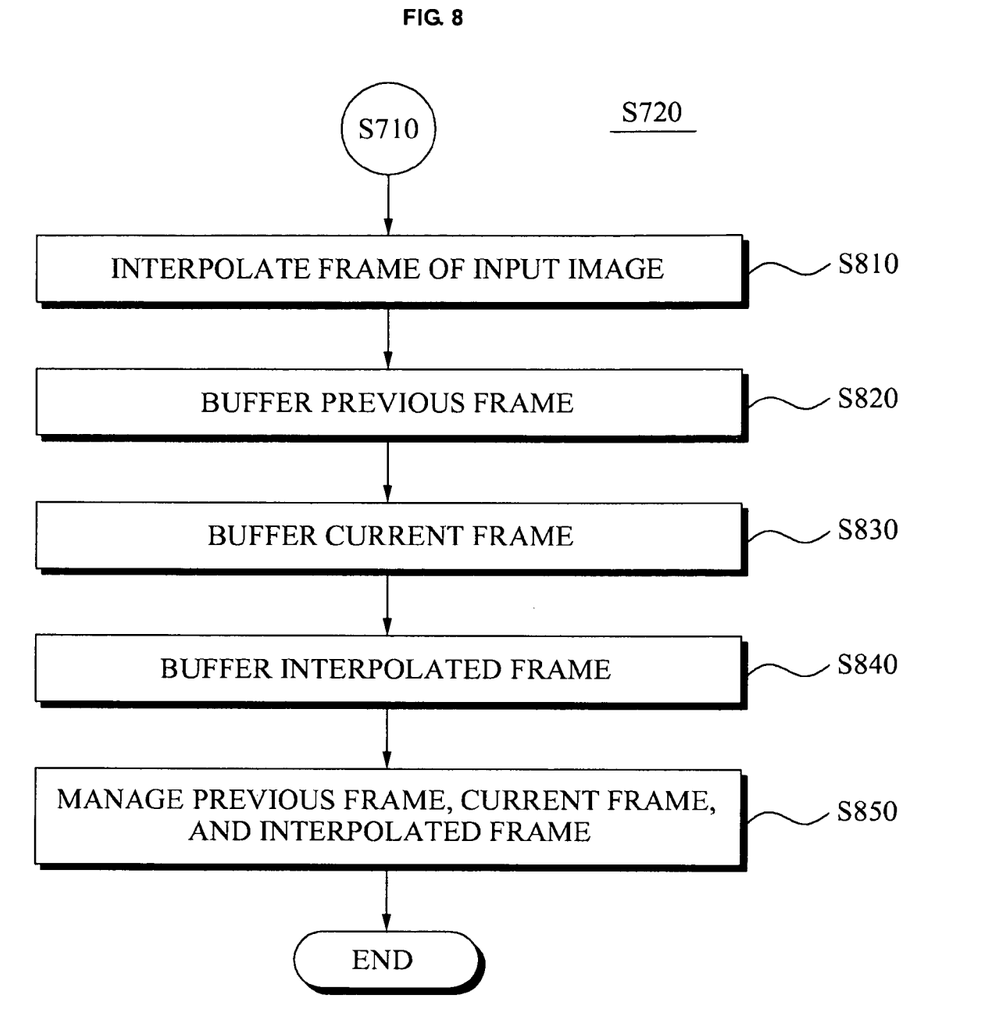
FIG. 8 is a flowchart illustrating an example of an operation of converting a frame rate of FIG. 7 in detail.

FIG. 8 is a flowchart illustrating an example of an operation of converting a frame rate of FIG. 7 in detail.

Referring to FIG. 8, in operation S810, the frame rate conversion apparatus may interpolate a frame of the input image. Specifically, in operation S810, the frame rate conversion apparatus may output an image frame interpolated by motion estimation from the previous division image frame and the current division image frame.

Hereinafter, an operation of interpolating a frame is described in detail with reference to FIG. 9.

Figure 9:
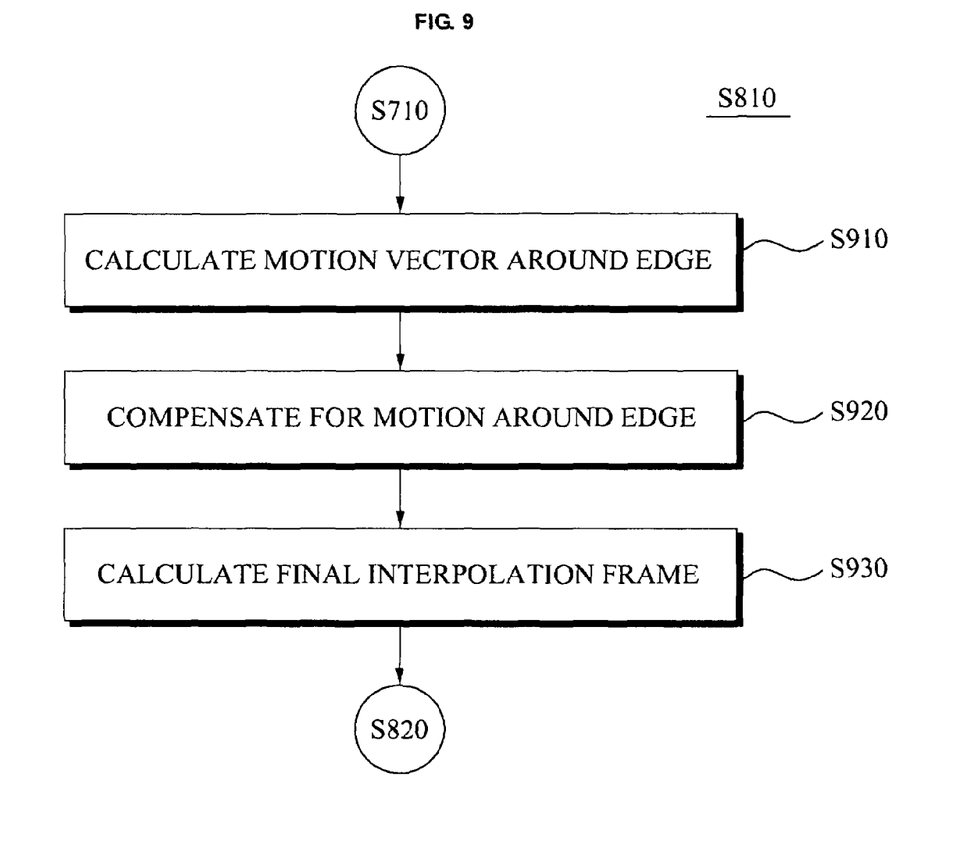
FIG. 9 is a flowchart illustrating an example of an operation of interpolating a frame of FIG. 8 in detail.

FIG. 9 is a flowchart illustrating an example of an operation of interpolating a frame of FIG. 8 in detail.

Referring to FIG. 9, in operation S910, the frame rate conversion apparatus may compare a macroblock of the previous division image frame and a macroblock of the current division image frame within a search range of a corresponding block, and thereby may calculate a motion vector map. Also, in operation S910, the frame rate conversion apparatus may read image data from each of the N−1 memories, and calculate a motion vector around the edge. Specifically, in operation S910, the frame rate conversion apparatus may calculate the motion vector map by comparing the macroblock of the previous division image frame and the macroblock of the current division image frame, read image data of the previous division image frame and image data of the current division image frame around an edge of each of the divided image frames from the N−1 memories, and thereby may calculate the motion vector.

In operation S920, the frame rate conversion apparatus may compensate for motion around the edge using the calculated motion vector, the previous division image frame, and the current division image frame. Specifically, in operation S920, the frame rate conversion apparatus may compensate for the motion around the edge by referring to the calculated motion vector, image data of the previous division image frame, and image data of the current division image frame.

In operation S930, the frame rate conversion apparatus may calculate a final interpolation frame based on the interpolated motion around the edge. Specifically, in operation S930, the frame rate conversion apparatus may calculate an edge of an interpolation frame based on the interpolated motion around the edge by referring to the image data of the previous division image frame and the image data of the current division image frame from the N−1 memories.

In operation S820, the frame rate conversion apparatus may buffer the previous frame. That is, in operation S820, the frame rate conversion apparatus may buffer the previous frame of received images of the N images.

In operation S830, the frame rate conversion apparatus may buffer the current frame. That is, in operation S830, the frame rate conversion apparatus may buffer the current frame of the received images of the N images.

In operation S840, the frame rate conversion apparatus may buffer the interpolated frame. That is, in operation S840, the frame rate conversion apparatus may buffer the frame where the previous frame and the current frame are interpolated with respect to the received images of the N images.

In operation S850, the frame rate conversion apparatus may manage the previous frame, the current frame, and the interpolated frame. Specifically, the frame rate conversion apparatus may insert the interpolated frame between the previous frame and the current frame, and thereby may manage the frames.

As described above, the frame rate conversion method may divide a UD image into N images, and convert a frame rate of each of the N images by referring to image data of a previous frame and image data of a current frame of an edge through N frame rate converters. Accordingly, the frame rate conversion method may improve a frame replay speed and image quality.

The frame rate conversion method according to the above-described example embodiments may be recorded as computer readable code/instructions in/on a computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. A frame rate conversion apparatus, comprising:
    N−1 memories to store a previous frame and a current frame of an edge of an input image, the input image being divided into N images; and
    N frame rate converters to convert a frame rate of each of the N images by referring to each of the N−1 memories and by interpolating a frame based on the previous frame and the current frame of the input image and then inserting the interpolated frame between the previous frame and the current frame using a delay circuit.

2. The frame rate conversion apparatus of claim 1, wherein each of the N frame rate converters comprises:
    a frame interpolation unit to interpolate the frame of the input image;
    a first frame memory to buffer the previous frame;
    a second frame memory to buffer the current frame;
    a third frame memory to buffer the interpolated frame;
    a memory controller to control the first frame memory, the second frame memory, and the third frame memory; and
    a frame management unit to manage the previous frame, the current frame, and the interpolated frame.

3. The frame rate conversion apparatus of claim 2, wherein the frame management unit inserts the interpolated frame between the previous frame and the current frame.

4. The frame rate conversion apparatus of claim 2, wherein the frame interpolation unit comprises:
    a motion estimation unit to compare a macroblock of the previous frame and a macroblock of the current frame within a search range of a corresponding block to calculate a motion vector map, and to read image data from each of the N−1 memories to calculate a motion vector around the edge;
    a motion compensation unit to compensate for motion around the edge using the calculated motion vector, the previous frame, and the current frame; and
    an interpolation frame calculation unit to calculate a final interpolation frame based on the interpolated motion around the edge.

5. The frame rate conversion apparatus of claim 4, wherein the interpolation frame calculation unit calculates the final interpolation frame based on the edge image information from each of the N−1 memories.

6. A frame rate conversion method, comprising:
    storing a previous frame and a current frame of an edge of an input image in each of N−1 memories, the input image being divided into N images;
    interpolating a frame based on the previous frame and the current frame of the input image and then inserting the interpolated frame between the previous frame and the current frame using a delay circuit; and
    converting a frame rate of each of the N images through N frame rate converters by referring to the stored previous frame and the stored current frame.

7. The frame rate conversion method of claim 6, wherein the converting comprises:
    buffering the previous frame;
    buffering the current frame; and
    buffering the interpolated frame.

8. The frame rate conversion method of claim 7, further comprising:
    transmitting an output image comprising the previous frame, the current frame, and the interpolated frame.

9. The frame rate conversion method of claim 8, wherein the interpolating comprises:
    comparing a macroblock of the previous frame and a macroblock of the current frame within a search range of a corresponding block to calculate a motion vector map, and reading image data from each of the N−1 memories to calculate a motion vector around the edge;
    compensating for motion around the edge using the calculated motion vector, the previous frame, and the current frame; and
    calculating a final interpolation frame based on the interpolated motion around the edge.

10. The frame rate conversion method of claim 9, wherein the calculating of the final interpolation frame calculates the final interpolation frame based on edge image information from each of the N−1 memories.

11. A non-transitory computer-readable recording medium storing computer readable code including a program for implementing frame rate conversion method, comprising:
    storing a previous frame and a current frame of an edge of an input image in each of N−1 memories, the input image being divided into N images;
    interpolating a frame based on the previous frame and the current frame of the input image and then inserting the interpolated frame between the previous frame and the current frame using a delay circuit; and converting a frame rate of each of the N images through N frame rate converters by referring to the stored previous frame and the stored current frame.

12. A frame rate conversion apparatus, comprising:

N−1 memories to store a previous frame and a current frame of an edge of an input image, the input image being divided into N images; and N frame rate converters to convert a frame rate of each of the N images by referring to each of the N−1 memories, wherein each of the N frame rate converters further converts the frame rate of each of the N images by performing block-matching with respect to a predetermined macroblock of the previous frame and the current image of the input image.

13. The frame rate conversion apparatus of claim 1, wherein each of the N frame rate converters comprises:

a transmission unit to transmit an output image comprising the previous frame, the current frame, and the interpolated frame.

14. A frame rate conversion method, comprising:

storing a previous frame and a current frame of an edge of an input image in each of N−1 memories, the input image being divided into N images; and converting a frame rate of each of the N images through N frame rate converters by referring to the stored previous frame and the stored current frame and by performing block-matching with respect to a predetermined macroblock of the previous frame and the current image of the input image.

15. The frame rate conversion method of claim 6, further comprising:

transmitting an output image comprising the previous frame, the current frame, and the interpolated frame.

* * * * *

UNITED STATES PATENT AND TRADEMARK OFFICE
CERTIFICATE OF CORRECTION

PATENT NO. : 8,427,579 B2 Page 1 of 1
APPLICATION NO. : 12/382868
DATED : April 23, 2013
INVENTOR(S) : Kwon Ju Yi et al.

It is certified that error appears in the above-identified patent and that said Letters Patent is hereby corrected as shown below:

On the Title Page, Item (54) and in the Specification, Column 1, Line 2, Title: Delete "ULTRA DEFINITION" and insert -- ULTRA HIGH DEFINITION --, therefor.

Signed and Sealed this
Twentieth Day of August, 2013

Teresa Stanek Rea
*Acting Director of the United States Patent and Trademark Office*